June 24, 1930. E. FOLTA 1,768,314
CLEANING OF FILTERS
Filed March 21, 1929   3 Sheets-Sheet 1
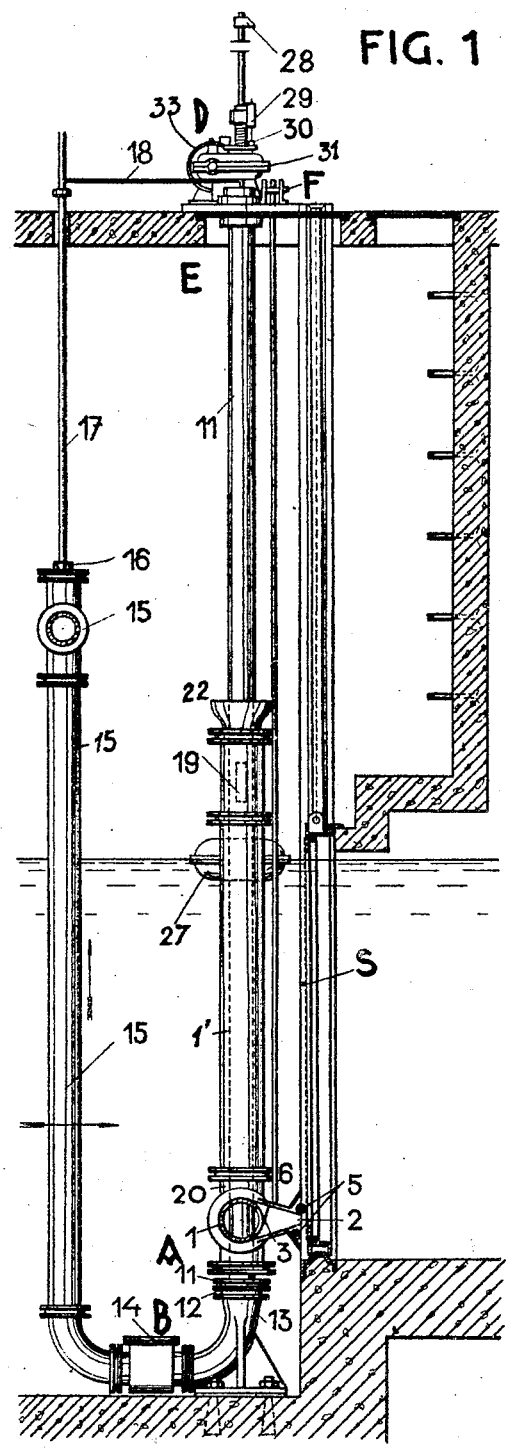
FIG. 1
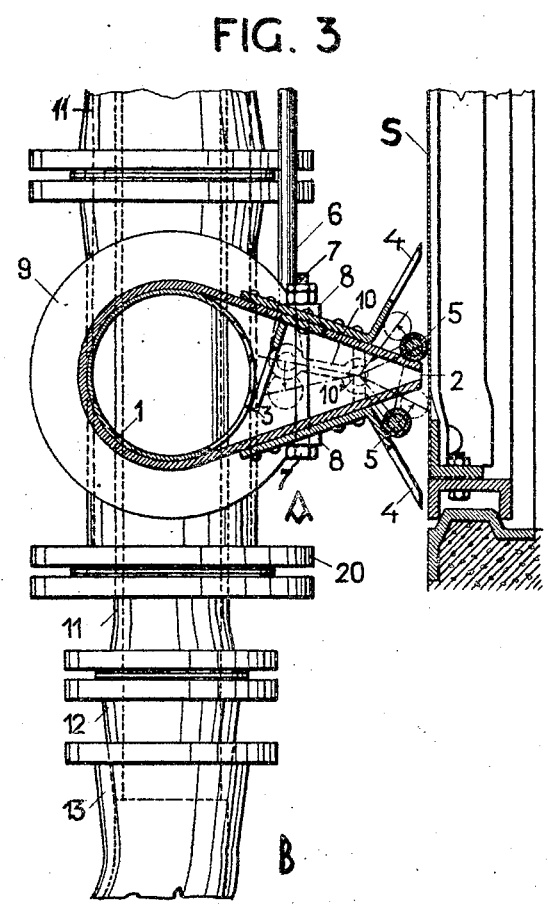
FIG. 3
FIG. 4
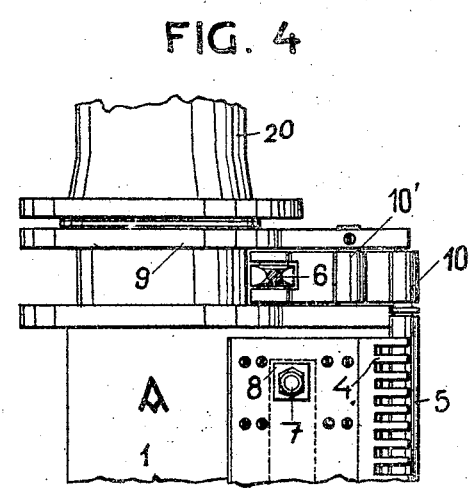
Emanuel Folta, Inventor,
By Byrnes, Townsend & Brickenstein,
Attorneys.

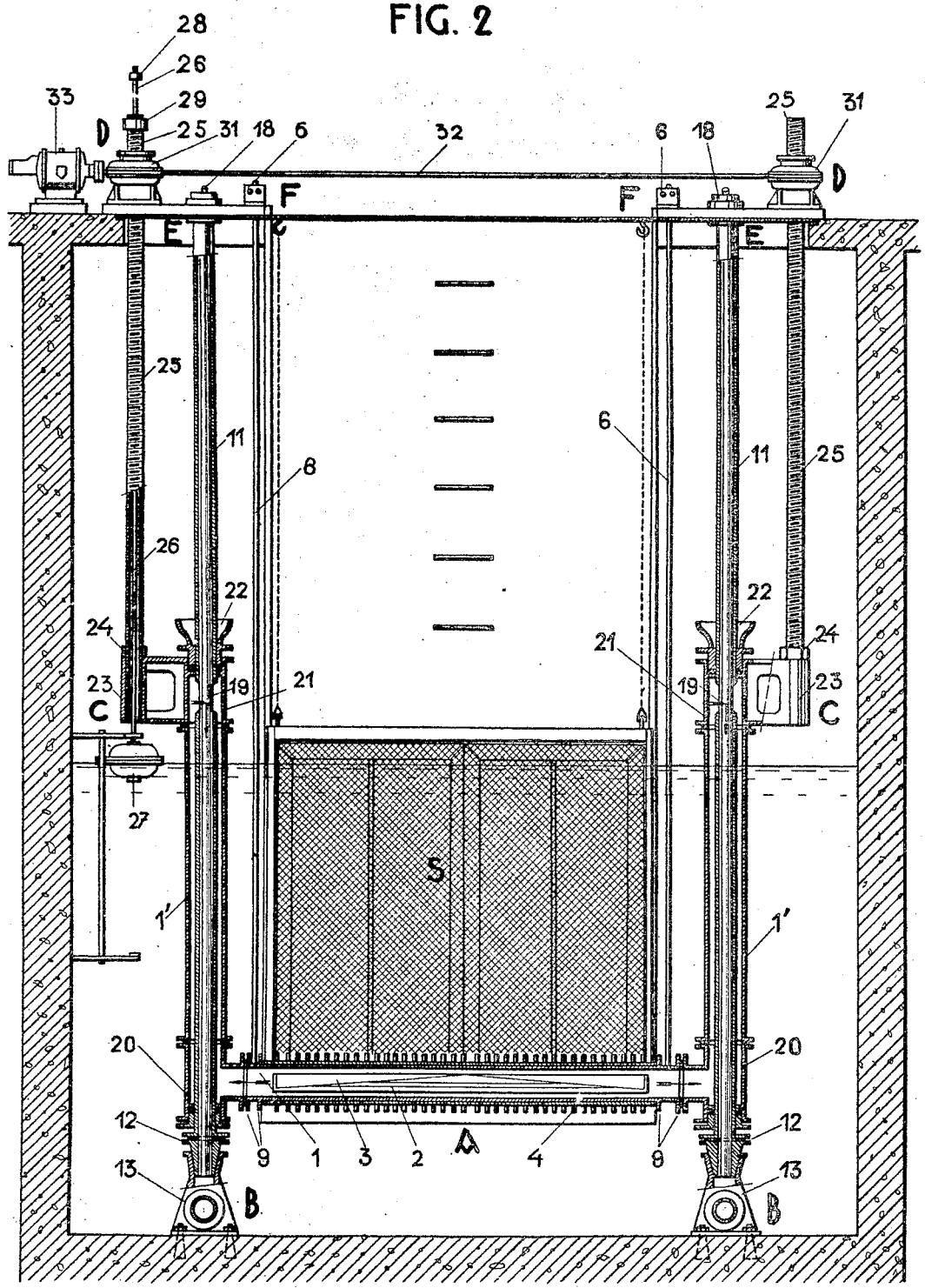

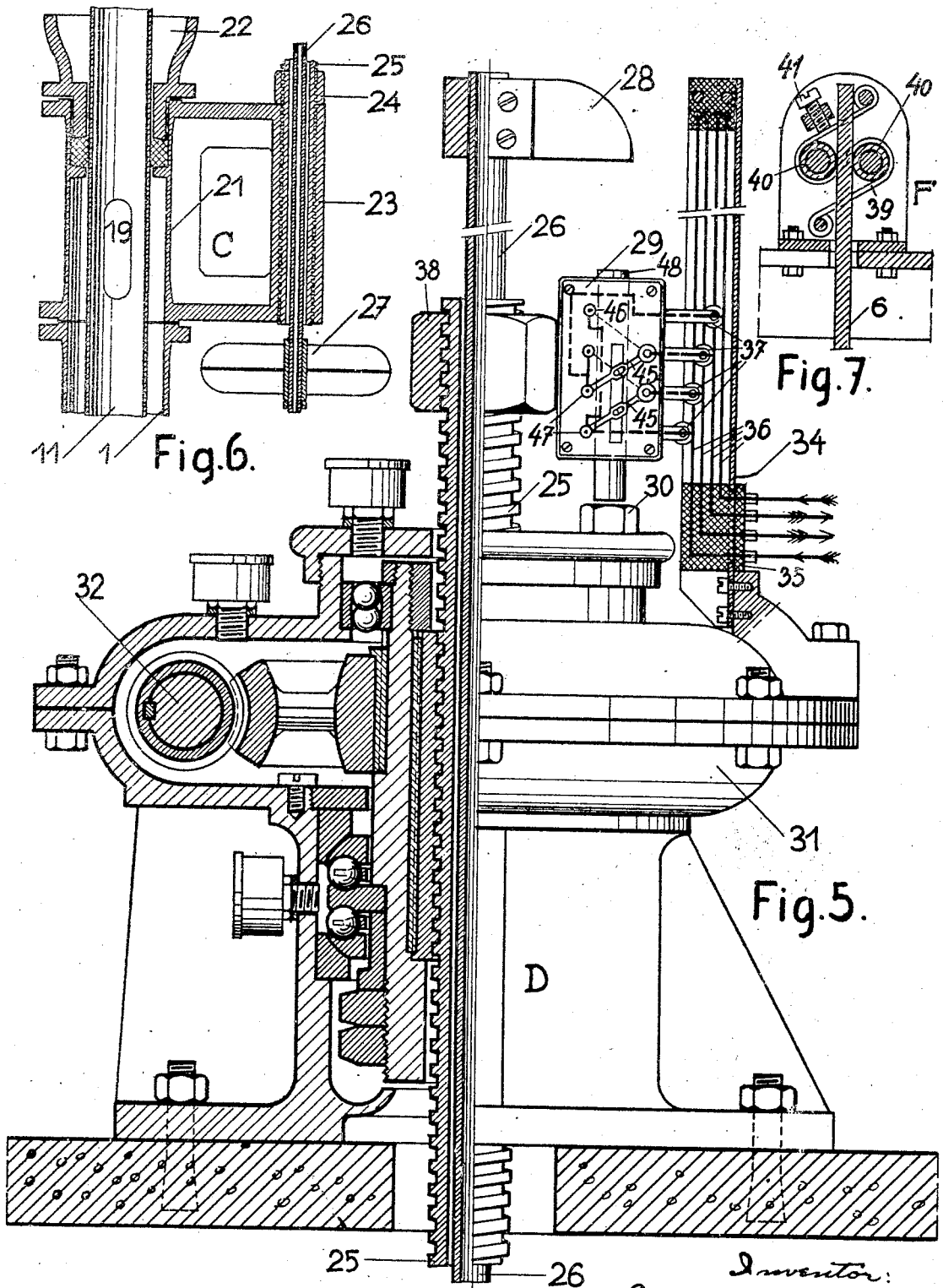

Patented June 24, 1930

1,768,314

UNITED STATES PATENT OFFICE

EMANUEL FOLTA, OF PRAGUE, CZECHOSLOVAKIA

CLEANING OF FILTERS

Application filed March 21, 1929, Serial No. 348,882, and in Czechoslovakia April 2, 1928.

This invention relates to an apparatus for the cleaning of filter sieves and gratings by drawing off the impurities from below the level of the liquid to be purified.

In the branch of engineering dealing with the purification of useful and waste water, for the purpose of retaining the impurities sieves and gratings are frequently used which during the operation of the filter are freed from the sediment either by hand or mechanically, intermittently or continuously, and in that way are made ready for further use. Hitherto, the cleaning of the fixed as well as of the movable sieves and gratings has been effected in accordance with various methods, by mechanically wiping the sieves by means of brushes or, in case of movable sieves, by rinsing and spraying them through with pure water under pressure, for which purposes the said sieves had to be raised above the level of the water to be purified into the cleaning chamber proper.

The proposed arrangement is intended for cleaning filter sieves and gratings by drawing off the impurities beneath the level of the liquid to be purified, without interrupting the continuity of the filtering process.

The arrangement used hitherto presented the disadvantage that mechanical damage was frequently done to the gratings and sieves during their cleaning, moreover a considerable wear of the complicated movable mechanisms occurred. Again a considerable amount of power was consumed in driving the mechanisms and a considerable amount of pure water was used for the spraying through and washing off of the impurities. Moreover, the sieves were cleaned inadequately, more particularly in the corners, and during the cleaning of the pulled up sieves, dirt was liable to pass into the pure water chamber also.

Among further disadvantages may be mentioned, the liability to interruption of the operation, the great space required, the pulling up the impurities above the water level and the heavy cost of building, maintenance and working.

The device according to the invention eliminates all these disadvantages owing to the impurities being drawn off from the surfaces of the filter gratings and sieves in a continuous and direct manner below the liquid level and at the side of the impure liquid which is to be filtered, that is, by means of suction conduits, the suction opening of which is constantly connected to a mud pump which discharges the mud or dirt into canalization. All this is done mechanically and automatically, without any hand labour and only with an occasional supervision.

The advantages of the arrangement according to the invention are: its simplicity of construction, small space required, low cost of building, maintenance and working, continuity of the cleaning process, hygienically perfect discharge of the impurities and perfect cleaning of the filtering surfaces without any abnormal wear of the mechanism.

In the accompanying drawing an example of an embodiment of the invention is illustrated; in said drawing, Figure 1 shows the general arrangement of the apparatus in section in a plane at right angles to the surface of the sieve, Figure 2 the general arrangement of the apparatus in section and in elevation in the direction of flow, that is, in a plane parallel to the surface of the sieve.

Figure 3 shows in section a detail view of the suction conduit with the suction opening, and of the sieve.

Figure 4 is a partial elevation of the suction conduit.

Fig. 5 is an elevational detailed view, partly in cross-section, showing the operating mechanism.

Fig. 6 is a cross-sectional view of another detail.

Fig. 7 is an end elevational view, partly in cross-section of the brake device.

The principal parts of the cleaning device according to the invention are as follows:

The suction conduit 1 (Figures 3 and 4) is made in the form of a tube provided with suction holes throughout the whole of its length opposite the suction slot 2. At the ends, the suction conduit is provided with two pairs of flanges 9 and extended into the suction opening 2. At the outer sides of the suction conduit, throughout the whole of their length are mounted two toothed mud arresters 4 and in the interior is inserted a toothed plate 3 extending throughout the whole length of the suction conduit and intended to ensure uniform distribution of the suction. At both sides of the suction slot, there are moreover provided two protective rubber-coated rollers 5 rotatably mounted on pins on a three-armed holder 10 freely rotatable on a pin 10′ and mounted on flanges 9. The width of slot is regulated by means of set screws 7 guided in cast-on bosses 8 of the suction conduit. The rollers are alternately turned to and from the sieve S by a positive movement (braking) of a connecting rod 6 pivoted by a pin to the third arm of the roller holder 10. The suction conduit is adjustably mounted at a given distance from the sieve surface S and secured at the ends by means of outer flanges 9 to two suspension and suction arms 1′.

The suction, and at the same time guide pipes 11 are supported at the bottom on a conical tube 12 close to a foot step 13 and lead through a check valve 14 to a pipe 15 and further to a mud pump and are vented at their highest points 16 by means of a vacuum pipe 17 which leads to an air suction pump. The guide pipes are secured at their upper ends to end parts E where venting is also provided by means of a pipe 18. In the centre of their length, the pipes 11 are provided with elongated admission openings 19 through which the impure water pumped passes.

The suspension and suction arms of the suction branch 1 are made in the form of flanged pipes and guided by means of packing pieces 20 and 21 on the guide pipes 11. The upper packing ends in a cup shaped tank 22 for the purpose of watering the packing. In the brackets 23 of the upper packing pieces are mounted hollow suspension spindles 25 secured in a bracket by means of fixing nuts 24 and terminating at the top in a mechanism D. A rod 26 of a float 27 passes through the hollow of the spindle 25 and carries at its upper end an impact projection 28 for automatically changing over an end switch 29, and thereby changing the movement of a driving motor 33 in accordance with the position of the water level. The end switch is mounted on the spindle 25, and a second impact projection 30 on the body of a driving mechanism D.

The switch consists of an angle bar 34 carrying insulator block 35 in which are embedded conductor rails 36 for contact rollers 37 of the switch 29 connected with the spindle 25 by means of a bearing nut 38. Two switch arms 45 and two pairs of contacts 46 and 47 connected to the contact rollers 37 are arranged to cooperate with the conductor rolls 36. By means of a slide bar 48, connected with the switch arms 45, said arms may be brought in the one or the other position to reverse the direction of the motor 33.

The driving mechanism D comprises substantially the usual gearing 31 for driving the nut of the spindle 25 by means of a counter shaft 32 and of the driving motor 33.

The upper closing devices E of the guide pipes 11 are of the usual construction and arrangement for connecting vacuum pipes.

The brake device F for the alternate reversing of the rollers 5 by means of the connecting rod 6 is of the usual construction. The object of this brake device is to press, during the movement of the suction slot, the rear roller (as regarded in the direction of said movement) against the sieve and against the slot casing (to turn it down) and to turn the front roller away from the sieve.

The brake device according to Fig. 7 consists of two flexible bands 39 holding two pressing rollers 40 and pressing them one against another. The stretch of the bands can be regulated by a set screw 41. Between the rollers passes the connecting rod 6 of the reversing device of the rollers 5.

By means of the screw spindle 25 the suction slot is moved up and down. At the end of the up-stroke, the switch 29 strikes with its bar 48 against the stop 28 of the float rod 26 and the switch arms 45 are thereby brought in the position drafted in full lines in Fig. 5. Thus, the running of the motor 33 being reversed, the suction slot descends; at the end of this descending movement, the switch bar 48 strikes against the stop 30 and the switch arms 45 are brought in the position drafted in dotted lines in Fig. 5. Thereby, the direction of movement of the motors 33 is again reversed and the suction slot ascends.

The position of the stop 28 is altered by means of the float according to the level of the water to be filtered.

Upon each reverse of the movement of the suction slot, the rod 6 is held by means of the rollers 40 so as to not move therewith; thereby the lever 10 is swung on its pivot and the position of the rollers is reversed. After this, as the lever 10 cannot move further, the rod 6 overcomes the braking action of the rollers 40 and moves with the suction slot sliding between the said rollers.

The working of the apparatus according to the invention is such that after the necessary vacuum has been produced in the two suction pipes 11 and 15 and the mud pump has been started, the water containing the impurities is drawn off from the sieve S through the suction opening 2 into the suction conduit 1, the suction effect being uniformly distributed throughout the whole length of the suction opening by means of the plate 3 and of the holes in the suction conduit 1. The stream containing impurities moves further into the space between the suspension arms 1' of the suction conduit 1 and the pipes 11 through the recesses 19 into the suction pipes 11 and through the check valves 14 through the pipes 15 into the mud pump which discharges the impurities into the canal. The electric motor drives the mechanism D which moves the suction conduit 1 from one end position parallel to the sieve surface S to the other end position where the direction of movement is automatically reversed by the float in accordance with the level of the water to be filtered at the time, by means of the projection 28 and of the end switch 29, this reversing taking place before the suction opening can draw in air. The process is repeated until in the first end position the direction of movement is again changed by the fixed projection 30. At each change of direction, the rollers 5 are turned over by means of the braked connecting rod 6 in such a manner that the turned up front roller does not press the sediment layer into the sieve, and the turned down rear roller protects the sieve from bending and concentrates the suction effect on a narrow strip of the sieve. The comb shaped guards 4 prevent any coarse particles of mud from passing in front of the suction slot. The whole process of cleaning after the motor 33 has been started, is automatic and continuous without any interference with the process of filtration during the work of cleaning.

I claim:

1. In an apparatus for cleaning filter sieves and gratings, a slotted suction nozzle arranged in front of the filtering surface, means for producing a relative movement between the filtering surface and the suction nozzle below the water level, toothed mud arresters, one above and one below the suction nozzle, an adjustable packing roller arranged between said suction nozzle and each mud arrester, mounting means for said rollers, and a common means acting at the end of the stroke of the relative movement between the suction nozzle and the filtering surface for simultaneously reversing the position of both rollers in front of the filtering surface whereby the rear roller, in the direction of the said relative movement, bears against the filtering surface, the other roller being out of contact with said surface.

2. An apparatus as in claim 1 wherein said mounting means comprises a three-armed holder, the ends of the rollers being mounted in two arms of the same, and the remaining arm being pivotally connected with a rod guided in a friction device opposing movement of the rod.

3. The invention as set forth in claim 1 wherein said common means comprises a rod connected to said mounting means, stationary friction rollers engaging said rod and means for causing said friction rollers to bear against said rod.

4. In an apparatus according to claim 1, means controlled by the liquid level for reversing the relative movement between the suction nozzle and the filtering surface.

5. In an apparatus according to claim 1, means controlled by the liquid level for reversing the relative movement between the suction nozzle and the filtering surface, said means comprising a switch mechanism, an upper stop positioning the same in accordance with the level of the liquid to be filtered, said upper stop cooperating with said switch mechanism and a fixed lower stop also cooperating with said switch mechanism.

6. In an apparatus according to claim 1, means for automatically reversing the relative movement between the suction nozzle and the filtering surface in accordance with the liquid level, said means comprising a float and a switch stop carried by said float.

7. In apparatus for cleaning filter sieves, a suction nozzle, driving means for moving said nozzle across the sieve, control means operable by the travel of said nozzle for reversing the direction of said driving means, and regulating means controlled by the level of the liquid for adjusting the action of said control means in accordance with the liquid level whereby the travel of said nozzle is regulated in accordance with the liquid level.

8. The invention as set forth in claim 7 wherein said driving means comprises an electric motor connected to a worm gear.

9. The invention as set forth in claim 7 wherein said control means comprises an electrical limit switch operable by the travel of said nozzle.

10. The invention as set forth in claim 7 wherein said regulating means comprises a float and a stop carried thereby.

EMANUEL FOLTA.